United States Patent
Randle

Patent Number: 5,868,574
Date of Patent: Feb. 9, 1999

[54] MODEL HOUSE

[76] Inventor: Steve C. Randle, 4435 L. Honoapiilani Rd., Lahaina, Hi. 96761

[21] Appl. No.: 702,882

[22] Filed: Aug. 26, 1996

[51] Int. Cl.$^6$ .................................................. G09B 25/04
[52] U.S. Cl. ............................................. 434/72; 434/370
[58] Field of Search .................................... 434/72, 79, 74, 434/75, 76, 370, 80; 446/108, 110

[56] References Cited

U.S. PATENT DOCUMENTS

| | | | |
|---|---|---|---|
| 2,951,311 | 9/1960 | Luther | 434/79 X |
| 3,751,848 | 8/1973 | Ahlstrand . | |
| 3,863,419 | 2/1975 | Hendrich | 446/110 X |
| 4,227,336 | 10/1980 | Misterka . | |
| 4,530,196 | 7/1985 | O Bryan | 52/747 |
| 4,884,988 | 12/1989 | McMurray | 446/115 |
| 5,205,772 | 4/1993 | Kennard et al. | 446/124 |

FOREIGN PATENT DOCUMENTS

| | | | |
|---|---|---|---|
| 2458116 | 1/1981 | France | 434/79 |
| 2681170 | 3/1993 | France | 434/72 |

Primary Examiner—Jeffrey A. Smith

[57] ABSTRACT

The present invention relates to a model house (10) having a transparent roof (12) and plurality of columns each securely mounted to a base (20). At least three first floor left-right beams (14LRA) which support at least four first floor back-front beams (14BFA). A flooring (24) is securely fastened onto the at least four first floor back-front beams (14BFA). At least two back-front lower beams securely fastened to at least two roof left-right lower beams. A roof left-right center beam (16LRC) is securely fastened to a top distal end of the left-middle-center column (18LMC) and the right-middle-center column (18RMC) by fasteners (22). A roof left-back support beam (16LBD) is securely fastened at a lower distal end to the roof left-right-back lower beam (16LRBL) and the roof back-front-back left lower beam (16BFLL). A roof left-front support beam (16LFD) is securely fastened at a lower distal end to the roof back-front-back left lower beam (16BFLL) and the roof left-right-front lower beam (16LRFL). A roof right-back support beam (16RBD) is securely fastened at a lower distal end to the roof left-right-back lower beam (16LRBL) and the roof back-front-back right lower beam (16BFRL). A roof right-front support beam (16RFD) is securely fastened at a lower distal end to the roof left-right-front lower beam (16LRFL) and the roof back-front-back right lower beam (16BFRL). The model house has a transparent roof (12).

11 Claims, 3 Drawing Sheets

MODEL HOUSE

BACKGROUND OF THE INVENTION

1. Field of the Invention

The present invention relates to model houses. More particularly, the present invention relates to model houses having translucent and/or transparent roofs to allow a person to view the insides of the house.

2. Description of the Prior Art

Miniature houses are well known in the art. The construction of model homes and buildings is increasing in popularity as a hobby and craft. Kits or pre-built miniature homes are commonly sold in the United States. In addition, doll houses of various types having varying interiors provide a recreational and educational structure. Miniature houses can teach builders a new construction to minimize construction time as well as exhibit a new house prior to construction to a potential client.

Numerous innovations for miniature houses have been provided in the prior art that are described as follows. Even though these innovations may be suitable for the specific individual purposes to which they address, they differ from the present invention as hereinafter contrasted.

In U.S. Pat. No. 4,530,196, titled, MODULAR BUILDING CONSTRUCTION, by inventor, O'Bryan, modular structural elements found by cutting, scoring and folding multiple layer corrugated paperboard sheets which can be used singly and in combination in the construction of a building structure is described. In U.S. Pat. No. 4,884,988, titled, INTERCONNECTING BUILDING TOY PANELS, by inventor, McMurray, a creative building playtoy, for children which allows rapid interlocking and disconnecting panels is disclosed. In U.S. Pat. No. 3,751,848, titled, MODEL HOUSE, by inventor, Ahlstrand, a model house that can be erected from a combination of parts without tools or fasteners and then can be easily knocked down for shipment or storage is described and claimed. In U.S. Pat. No. 4,227,336, titled, MINIATURE HOUSE CONSTRUCTION, by inventor, Misterka, an L-shaped member which provides a support for the exterior wall sections and the ground flooring in the construction of miniature homes is described and claimed. In U.S. Pat. No. 5,205,772, titled, SEGMENTED TOY HOUSE CONSTRUCTION, by inventor, Kennard et al., a toy house configured for construction to include a plurality of segmented members inter-fitting relative to one another to effect an erected structure is disclosed. The above described patented inventions differ from the present invention because they lack a transparent roof, left-right beams supporting back-front beams, roof back-front-back lower beams, roof left-right lower beams, roof left-right center beam, roof left-back support beam, roof left-front support beam, roof right-back support beam, roof right-front support beam, and a plurality of columns securely fastened to a base having a base column support by a plurality of fasteners.

Numerous innovations for model houses have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to model houses. More particularly, the present invention relates to model houses having translucent and/or transparent roofs to allow a person to view the insides of the house.

The types of problems encountered in the prior art are model houses lack a transparent roof which functions to facilitate viewing therein.

In the prior art, unsuccessful attempts to solve this problem were attempted namely: houses and or buildings constructed entirely from transparent material. However, the problem was solved by the present invention because the model house is constructed identically as the real house with the exception of a transparent roof.

Innovations within the prior art are rapidly being exploited in the field of model building.

The present invention went contrary to the teaching of the art which describes buildings and houses constructed entirely from transparent material.

The present invention solved a long felt need for a model house having a similar or identical construction as an actual house with a transparent roof for viewing.

The present invention produced unexpected results namely: sales of construction of actual houses increased by first exhibiting the model house.

A synergistic effect was produced utilizing the present invention due to the following facts and results from experimentation: builders could teach their workers how to construct of the actual house, reducing construction time, by first exhibiting the model house.

Accordingly, it is an object of the present invention to provide a model house.

More particularly, it is an object of the present invention to provide a model house having a transparent roof.

In keeping with these objects, and with others which will become apparent hereinafter, one feature of the present invention resides, briefly stated, in the transparent roof comprising a left transparent roof, a right transparent roof, a back transparent roof, and a front transparent roof.

When the back transparent roof is designed in accordance with the present invention, it comprises a back-front transparent roof connector (12BFC), back-left transparent roof appendage (12BLA), a back-left transparent roof connector (12BLC), a back-right transparent roof appendage (12BRA), and a back-right transparent roof connector (12BRC).

In accordance with another feature of the present invention, the front transparent roof comprises a front-left transparent roof appendage (12FLA), a front-left transparent roof connector (12FLC), a front-right transparent roof appendage (12FRA), and a front-right transparent roof connector (12FRC).

Another feature of the present invention is that first floor left-right beams are utilized in conjunction with first floor back-front beams.

Yet another feature of the present invention is that second floor left-right beam are utilized in conjunction with second floor back-front beams.

Still another feature of the present invention is that overhang left-right beams are utilized in conjunction with overhang back-front beams.

Yet still another feature of the present invention is that roof back-front-back left lower beams and roof back-front-back right lower beam are utilized in conjunction with roof left-right-front lower beams and roof left-right-back lower beams.

Still yet another feature of the present invention is that the roof back-front upper left beam, roof back-front upper right beam, roof left-right center beam, roof left-back support beam, roof left-front support beam, roof right-back support beam, roof right-front support beam, roof left-right-front support beam, roof left-right-right-back support beam, roof left-right-right-middle support beam, roof left-right-left-front support beam, roof left-right-left-back support beam, and roof left-right-left-middle support beam are utilized in conjunction with roof back-front-left-front support beam, roof back-front-middle-front support beam, roof back-front-left-back support beam, roof back-front-right-front support beam, roof back-front-right-back support beam, roof back-front-right-front support beam, and roof back-front-middle-back support beam.

Another feature of the present invention is that a plurality of columns are each attached to a base having a base column support by a fastener.

Yet another feature of the present invention is that the plurality of columns comprise: back-left column, back-right column, back-middle column, front-left column, front-right column, front-middle column, left-middle column, left-middle-center column, right-middle column, right-middle-center column, right overhang column, left overhang column, and middle overhang column.

Still another feature of the present invention is that the model house has flooring on at least one floor.

Yet still another feature of the present invention is that the overhang has a transparent overhang roof.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—model house (10)
12—transparent roof (12)
12L—left transparent roof (12L)
12R—right transparent roof (12R)
12B—back transparent roof (12B)
12BFC—back-front transparent roof connector (12BFC)
12BLA—back-left transparent roof appendage (12BLA)
12BLC—back-left transparent roof connector (12BLC)
12BRA—back-right transparent roof appendage (12BRA)
12BRC—back-right transparent roof connector (12BRC)
12F—front transparent roof (12F)
12FLA—front-left transparent roof appendage (12FLA)
12FLC—front-left transparent roof connector (12FLC)
12FRA—front-right transparent roof appendage (12FRA)
12FRC—front-right transparent roof connector (12FRC)
14LRA—first floor left-right beam (14LRA)
14LRB—second floor left-right beam (14LRB)
14LRO—overhang left-right beam (14LRO)
14BFA—first floor back-front beam (14BFA)
14BFB—second floor back-front beam (14BFB)
14BFO—overhang back-front beam (14BFO)
16BFLL—roof back-front-back left lower beam (16BFLL)
16BFRL—roof back-front-back right lower beam (16BFRL)
16BFLU—roof back-front upper left beam (16BFLU)
16BFRU—roof back-front upper right beam (16BFRU)
16LRFL—roof left-right-front lower beam (16LRFL)
16LRBL—roof left-right-back lower beam (16LRBL)
16LRC—roof left-right center beam (16LRC)
16LBD—roof left-back support beam (16LBD)
16LFD—roof left-front support beam (16LFD)
16RBD—roof right-back support beam (16RBD)
16RFD—roof right-front support beam (16RFD)
16LRRFD—roof left-right-right-front support beam (16LRRFD)
16LRRBD—roof left-right-right-back support beam (16LRRBD)
16LRRMD—roof left-right-right-middle support beam (16LRRMD)
16LRLFD—roof left-right-left-front support beam (16LRLFD)
16LRLBD—roof left-right-left-back support beam (16LRLBD)
16LRLMD—roof left-right-left-middle support beam (16LRLMD)
16BFLFD—roof back-front-left-front support beam (16BFLFD)
16BFFD—roof back-front-middle-front support beam (16BFMFD)
16BFLBD—roof back-front-left-back support beam (16BFLBD)
16BFRFD—roof back-front-right-front support beam (16BFRFD)
16BFRBD—roof back-front-right-back support beam (16BFRBD)
16BFRFD—roof back-front-right-front support beam (16BFRFD)
16BFMBD—roof back-front-middle-back support beam (16BFMBD)
18BL—back-left column (18BL)
18BR—back-right column (18BR)
18BM—back-middle column (18BM)
18FL—front-left column (18FL)
18FR—front-right column (18FR)
18FM—front-middle column (18FM)
18LM—left-middle column (18LM)
18LMC—left-middle-center column (18LMC)
18RM—right-middle column (18RM)
18RMC—right-middle-center column (18RMC)
18RO—right overhang column (18RO)
18LO—left overhang column (18LO)
18MO—middle overhang column (18MO)
20—base (20)
20A—base column support (20A)
22—fastener (22)
24—flooring (24)
26—transparent overhang roof (26)

DESCRIPTION OF THE PREFERRED EMBODIMENT

Figure 1:
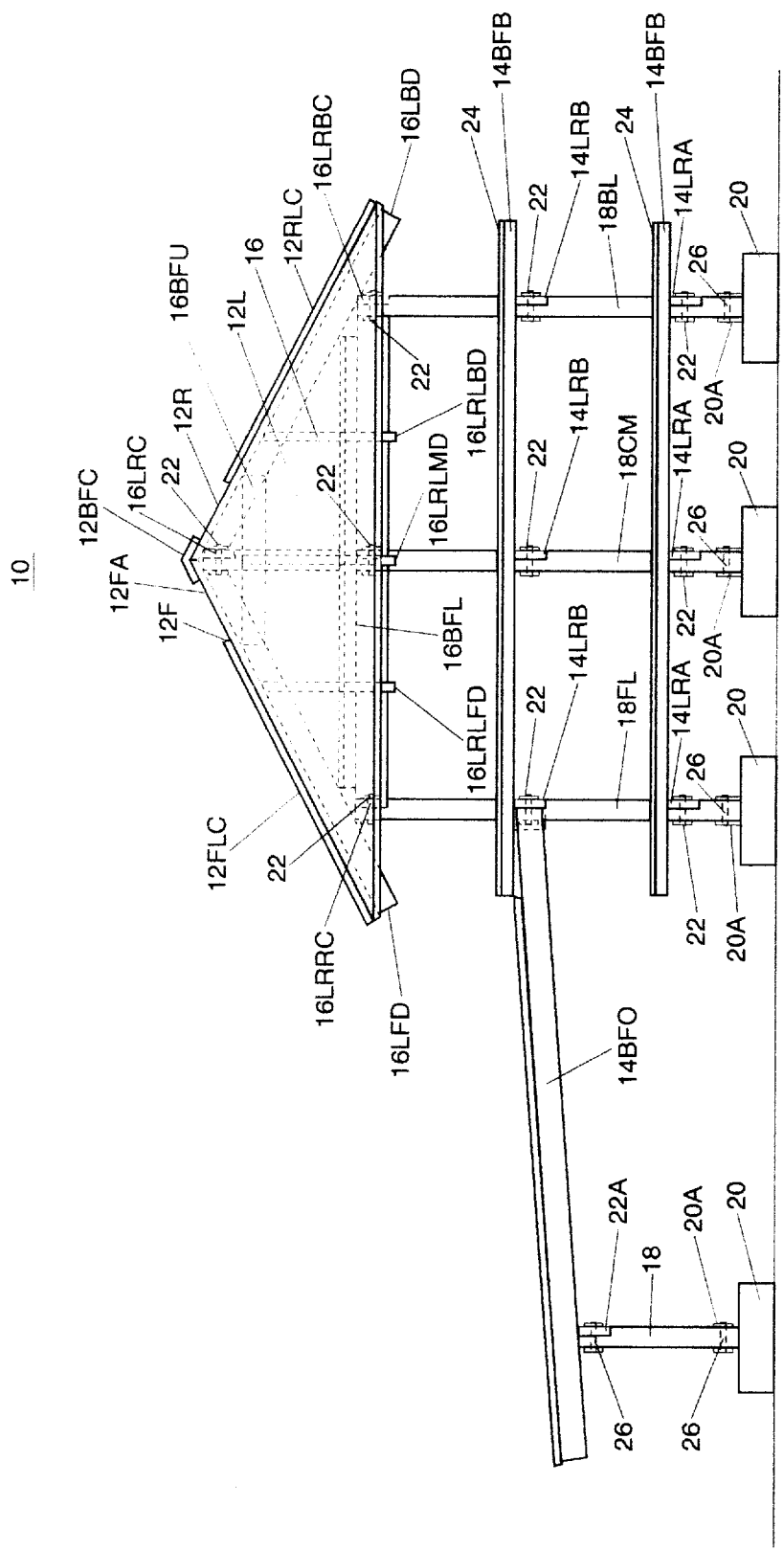
FIG. 1 is a side view of a model house.
Figure 1A:
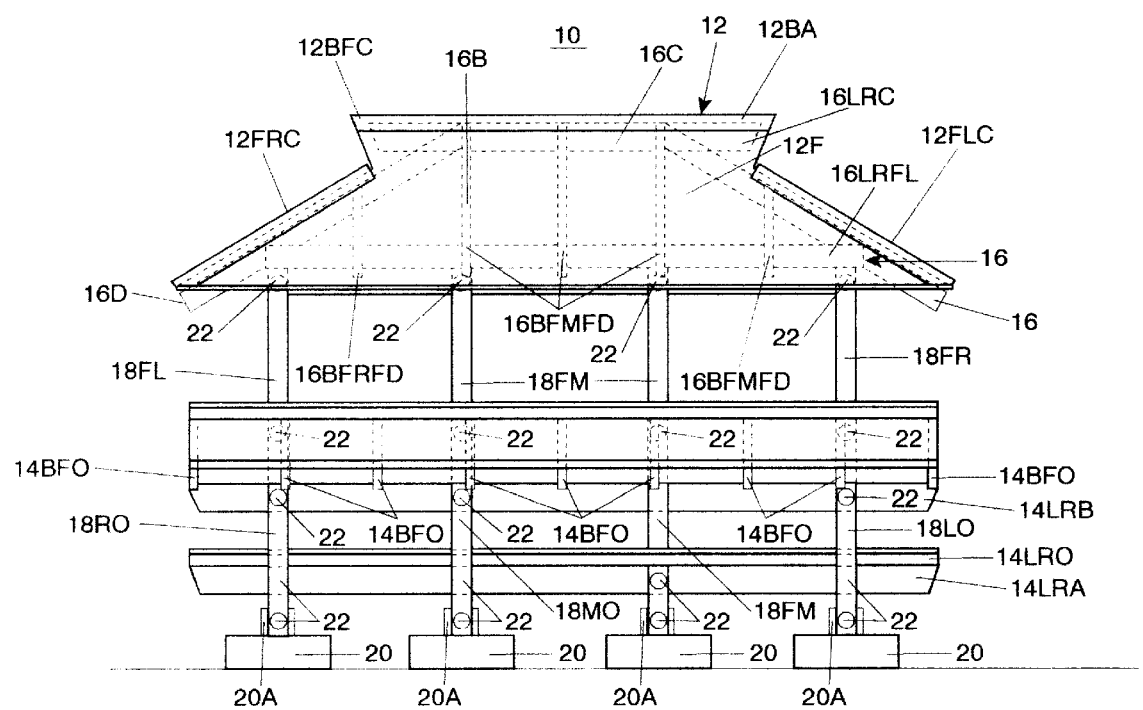
FIG. 1A is a front view of a model house.
Figure 2:
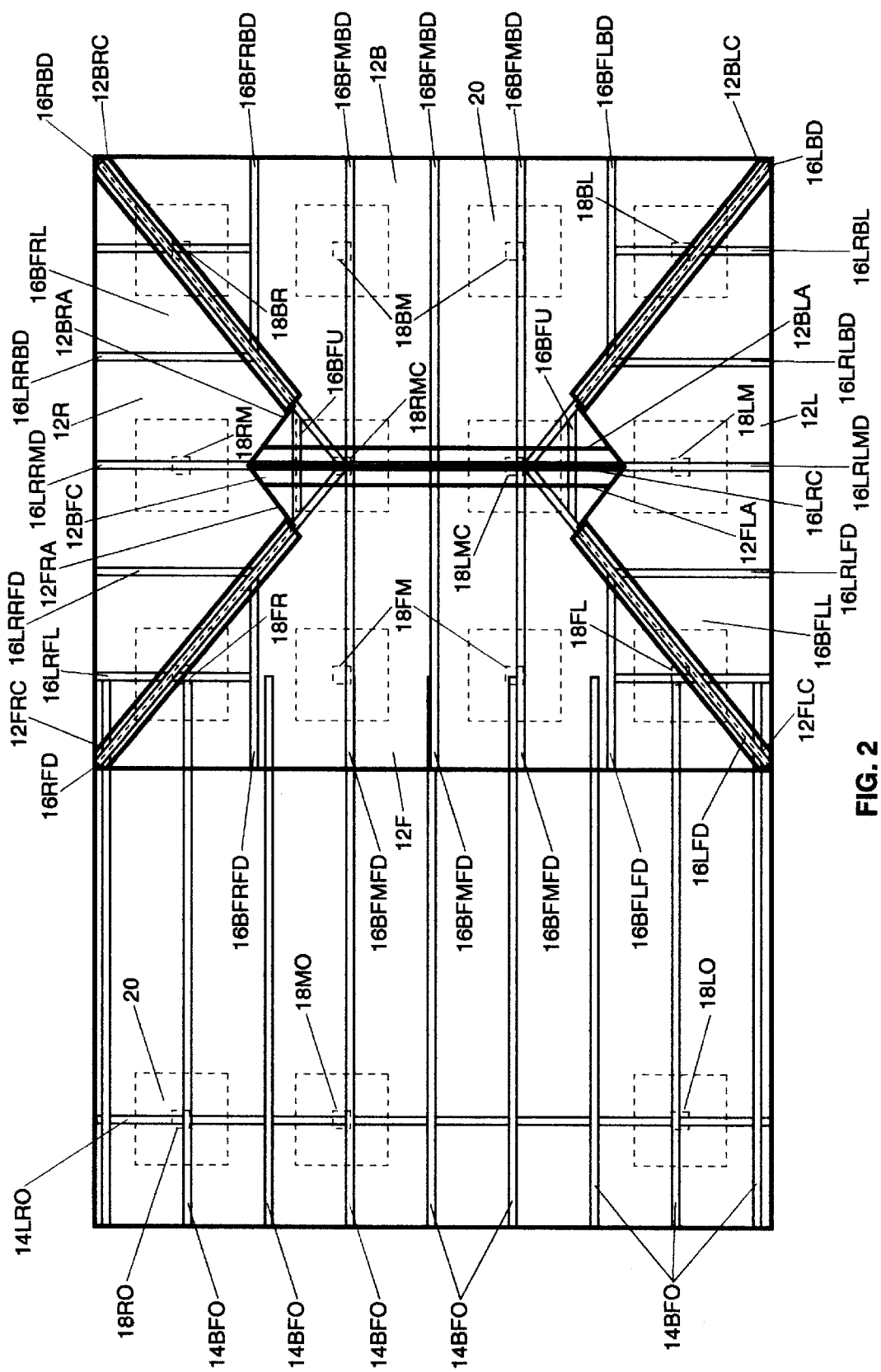
FIG. 2 is a top view of a model house.

Referring to FIG. 1, FIG. 1A, and FIG. 2 which are a left-side view, front view and top view of a model house (10), respectively. The model house (10) comprises: a back-left column (18BL) securely mounted to a base (20) comprising a base column support (20A) fastened thereto by a fastener (22). The model house (10) further comprises a back-right column (18BR) securely mounted to a base (20) comprising a base column support (20A) fastened thereto by a fastener (22). The model house (10) further comprises a front-left column (18FL) securely mounted to a base (20) comprising a base column support (20A) fastened thereto by a fastener (22). The model house (10) further comprises a front-right column (18FR) securely mounted to a base (20) comprising a base column support (20A) fastened thereto by a fastener (22). The model house (10) further comprises a right-middle-center column (18RMC) securely mounted to a base (20) comprising a base column support (20A) fastened thereto by a fastener (22). The model house (10) further comprises a left-middle-center column (18LMC) securely mounted to a base (20) comprising a base column support (20A) fastened thereto by a fastener (22).

The model house (10) may optionally comprise at least one left-middle column (18LM) securely fastened to a base (20) having a base column support (20A) by a fastener (22). The at least one left-middle column (18LM) is securely fastened to the roof back-front-back left lower beam (16BFLL) by a fastener (22) and at least one right-middle column (18RM) securely fastened to a base (20) having a base column support (20A) by a fastener (22). The at least one right-middle column (18RM) is securely fastened to the roof back-front-back right lower beam (16BFRL). The model house (10) may optionally comprise a right overhang column (18RO) securely fastened to a base (20) having a base column support (20A) by a fastener (22) and a left overhang column (18LO) securely fastened to a base (20) having a base column support (20A) by a fastener (22). The model house (10) may optionally comprise at least one overhang left-right beam (14LRO) securely fastened to the right overhang column (18RO) and the left overhang column (18LO) by fasteners (22). The model house (10) may optionally comprise at least two overhang back-front beams (14BFO) securely fastened at a front distal end to the at least one overhang left-right beam (14LRO) and securely fastened at a rear distal end to the roof left-right-front lower beam (16LRFL). The model house (10) may optionally comprise a transparent overhang roof (26) securely fastened to the at least two overhang back-front beams (14BFO). The transparent overhang roof (26) is constructed from a group of materials consisting of glass, plastic and plastic composite. The transparent overhang roof (26) is preferably constructed from a group of materials consisting of PLEXIGLAS (TM) and LEXAN (TM). The model house (10) may optionally comprise at least one middle overhang column (18MO) securely fastened to a base (20) having a base column support (20A) by a fastener (22). The at least one overhang left-right beam (14LRO) is securely fastened to the at least one middle overhang column (18MO).

The model house (10) further comprises at least three first floor left-right beams (14LRA) which support at least four first floor back-front beams (14BFA). The at least three first floor left-right beams (14LRA) are securely mounted to the columns (18BL, 18BR, 18FL, 18FR, 18LMC, 18RMC) by fasteners (22). A flooring (24) is securely fastened onto the at least four first floor back-front beams (14BFA).

The model house (10) may optionally comprise at least three second floor left-right beams (14LRB) which support at least four second floor back-front beams (14BFB). The at least three second floor left-right beams (14LRB) are securely mounted to the columns (18BL, 18BR, 18FL, 18FR, 18LMC, 18RMC) by fasteners (22). A flooring (24) is securely fastened onto the at least four second floor back-front beams (14BFB).

The model house (10) further comprises at least one roof back-front-back left lower beam (16BFLL) securely fastened at a front distal end to a left side of a roof left-right-front lower beam (16LRFL) and securely fastened at a left side of a rear distal end to a roof left-right-back lower beam (16LRBL). The model house (10) further comprises at least one roof back-front-back right lower beam (16BFRL) securely fastened at a right side of a front distal end to the roof left-right-front lower beam (16LRFL) and securely fastened at a right side of the rear distal end to a roof left-right-back lower beam (16LRBL). The at least one roof back-front-back left lower beam (16BFLL) is securely fastened to the back-left column (18BL) and the front-left column (18FL) by fasteners (22). The at least one roof back-front-back right lower beam (16BFRL) is securely fastened to the back-right column (18BR) and the front-right column (18FR) by fasteners (22). The roof left-right-front lower beam (16LRFL) is securely fastened to the front-left column (18FL) and the front-right column (18FR) by fasteners (22). The roof left-right-back lower beam (16LRBL) is securely fastened to the back-left column (18BL) and the back-right column (18BR) by fasteners (22).

The model house (10) further comprises a roof left-right center beam (16LRC) is securely fastened to a top distal end of the left-middle-center column (18LMC) and the right-middle-center column (18RMC) by fasteners (22). The model house (10) further comprises a roof left-back support beam (16LBD) is securely fastened at a lower distal end to the roof left-right-back lower beam (16LRBL) and the roof back-front-back left lower beam (16BFLL). The roof left-back support beam (16LBD) is securely fastened at an upper distal end to the roof left-right center beam (16LRC). A roof left-front support beam (16LFD) is securely fastened at a lower distal end to the roof back-front-back left lower beam (16BFLL) and the roof left-right-front lower beam (16LRFL). The roof left-front support beam (16LFD) is securely fastened at an upper distal end to the roof left-right center beam (16LRC). The model house (10) further comprises a roof right-back support beam (16RBD) securely fastened at a lower distal end to the roof left-right-back lower beam (16LRBL) and the roof back-front-back right lower beam (16BFRL). The roof right-back support beam (16RBD) is securely fastened at an upper distal end to the roof left-right center beam (16LRC). The model house (10) further comprises a roof right-front support beam (16RFD) securely fastened at a lower distal end to the roof left-right-front lower beam (16LRFL) and the roofback-front-back right lower beam (16BFRL). The roof right-front support beam (16RFD) is securely fastened at an upper distal end to the roof left-right center beam (16LRC).

The roof right-front support beam (16RFD) and the roof right-back support beam (16RBD) are securely fastened to one another by a roof back-front upper right beam (16BFRU) and the roof left-front support beam (16LFD) and the roof left-back support beam (16LBD) are securely fastened to one another by a roof back-front upper left beam (16BFLU). The model house (10) may optionally comprise a roof left-right-right-front support beam (16LRRFD) securely fastened at an upper distal end to the roof right-front support beam (16RFD) and securely fastened at a lower distal end to the roofback-front-back right lower beam (16BFRL). The model house (10) may optionally comprise a roof back-front-right-front support beam (16BFRFD) securely fastened at an upper distal end to the roof right-front support beam (16RFD) and securely fastened at a lower distal end to the roof left-right-front lower beam (16LRFL). The model house (10) may optionally comprise a roof back-front-left-front support beam (16BFLFD) securely fastened at an upper distal end to the roof left-front support beam (16LFD) and securely fastened at a lower distal end to the roof left-right-front lower beam (16LRFL).

The model house (10) may optionally comprise a roof left-right-left-front support beam (16LRLFD) securely fastened at an upper distal end to the roof left-front support beam (16LFD) and securely fastened at a lower distal end to the roof back-front-back left lower beam (16BFLL). The model house (10) may optionally comprise a roof left-right-left-back support beam (16LRLBD) securely fastened at an upper distal end to the roof left-back support beam (16LBD) and securely fastened at a lower distal end to the roof back-front-back left lower beam (16BFLL). The model house (10) may optionally comprise a roof back-front-left-back support beam (16BFLBD) securely fastened at an upper distal end to the roof left-back support beam (16LBD) and securely fastened at a lower distal end to the roof left-right-back lower beam (16LRBL). The model house (10) may optionally comprise a roof back-front-right-back support beam (16BFRBD) securely fastened at an upper distal end to the roof right-back support beam (16RBD) and securely fastened at a lower distal end to the roof left-right-back lower beam (16LRBL). The model house (10) may optionally comprise a roof left-right-right-back support beam (16LRRBD) securely fastened at an upper distal end to the roof right-back support beam (16RBD) and securely fastened at a lower distal end to the roof back-front-back right lower beam (16BFRL).

The model house (10) may optionally comprise a roof left-right-right-middle support beam (16LRRMD) securely fastened at an upper distal end to the roof left-right center beam (16LRC) and securely fastened at a lower distal end to the roof back-front-back right lower beam (16BFRL). The model house (10) may optionally comprise a roof left-right-left-middle support beam (16LRLMD) securely fastened at an upper distal end to the roof left-right center beam (16LRC) and securely fastened at a lower distal end to the roof back-front-back left lower beam (16BFLL). The model house (10) may optionally comprise at least one roof back-front-middle-front support beam (16BFMFD) securely fastened at an upper distal end to the roof left-right center beam (16LRC) and securely fastened at a lower distal end to the roof left-right-front lower beam (16LRFL). The model house (10) may optionally comprise at least one roof back-front-middle-back support beam (16BFMBD) securely fastened at an upper distal end to the roof left-right center beam (16LRC) and securely fastened at a lower distal end to the roof left-right-back lower beam (16LRBL). The model house (10) may optionally comprise at least one back-middle column (18BM) securely fastened to a base (20) having a base column support (20A) by a fastener (22). The at least one back-middle column (18BM) is securely fastened to the roof left-right-back lower beam (16LRBL) and at least one front-middle column (18FM) securely fastened to a base (20) having a base column support (20A) by a fastener (22). The at least one front-middle column (18FM) is securely fastened to the roof left-right-front lower beam (16LRFL). The model house (10) may optionally comprise a back transparent roof (12B) connected to a front transparent roof (12F) by a back-front transparent roof connector (12BFC). The back transparent roof (12B) is securely fastened to the roof right-back support beam (16RBD) and the roof left-back support beam (16LBD). The front transparent roof (12F) is securely fastened to the roof left-front support beam (16LFD) and the roof right-front support beam (16RFD). The transparent roof (12) further comprises a left transparent roof (12L) connected to the back transparent roof (12B) by a back-left transparent roof connector (12BLC). The left transparent roof (12L) is connected to the front transparent roof (12F) by a front-left transparent roof connector (12FLC). The left transparent roof (12L) is securely fastened to the roof left-front support beam (16LFD) and the roof left-back support beam (16LBD). The transparent roof (12) further comprises a right transparent roof (12R) connected to the back transparent roof (12B) by a back-right transparent roof connector (12BRC). The right transparent roof (12R) is connected to the front transparent roof (12F) by a front-right transparent roof connector (12FRC). The right transparent roof (12R) is securely fastened to the roof right-front support beam (16RFD) and the roof right-back support beam (16RBD). The transparent roof (12) is constructed from a material selected from a group consisting of glass, plastic, and plastic composites. The transparent roof (12) is preferably constructed from PLEXIGLAS (TM) and/or LEXAN (TM).

The back transparent roof (12B) comprises a back-left transparent roof appendage (12BLA) and a back-right transparent roof appendage (12BRA) and the front transparent roof (12F) comprises a front-left transparent roof appendage (12FLA) and a front-right transparent roof appendage (12FRA). The back-left transparent roof appendage (12BLA) is securely fastened to the front-left transparent roof appendage (12FLA). The right transparent roof appendage (12BRA) is securely fastened to the front-right transparent roof appendage (12FRA).

It will be understood that each of the elements described above, or two or more together, may also find a useful application in other types of constructions differing from the type described above.

While the invention has been illustrated and described as embodied in a model house, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A model house (10) comprising:
   A) a back-left column (18BL) securely mounted to a base (20) comprising a base column support (20A) fastened thereto by a fastener (22), a back-right column (18BR) securely mounted to the base (20) comprising the base column support (20A) fastened thereto by a fastener (22), a front-left column (18FL) securely mounted to the base (20) comprising the base column support (20A) fastened thereto by a fastener (22), a front-right column (18FR) securely mounted to the base (20) comprising the base column support (20A) fastened thereto by a fastener (22), a right-middle-center column (18RMC) securely mounted to the base (20) comprising the base column support (20A) fastened thereto by a fastener (22), and a left-middle-center column (18LMC) securely mounted to the base (20) comprising the base column support (20A) fastened thereto by a fastener (22);
   B) at least three first floor left-right beams (14LRA) which support at least four first floor back-front beams (14BFA), the at least three first floor left-right beams (14LRA) are securely mounted to the columns by fasteners (22), a flooring (24) is securely fastened onto the at least four first floor back-front beams (14BFA);

C) at least one roof back-front-back left lower beam (16BFLL) securely fastened at a front distal end to a left side of a roof left-right-front lower beam (16LRFL) and securely fastened at a left side of a rear distal end to a roof left-right-back lower beam (16LRBL), at least one roof back-front-back right lower beam (16BFRL) securely fastened at a right side of a front distal end to the roof left-right-front lower beam (16LRFL) and securely fastened at a right side of the rear distal end to a roof left-right-back lower beam (16LRBL), the at least one roof back-front-back left lower beam (16BFLL) is securely fastened to the back-left column (18BL) and the front-left column. (18FL) by fasteners (22), the at least one roof back-front-back right lower beam (16BFRL) is securely fastened to the back-right column (18BR) and the front-right column (18FR) by fasteners (22), the roof left-right-front lower beam (16LRFL) is securely fastened to the front-left column (18FL) and the front-right column (18FR) by fasteners (22), the roof left-right-back lower beam (16LRBL) is securely fastened to the back-left column (18BL) and the back-right column (18BR) by fasteners (22);

D) a roof left-right center beam (16LRC) is securely fastened to a top distal end of the left-middle-center column (18LMC) and the right-middle-center column (18RMC) by fasteners (22), a roof left-back support beam (16LBD) is securely fastened at a lower distal end to the roof left-right-back lower beam (16LRBL) and the roof back-front-back left lower beam (16BFLL), the roof left-back support beam (16LBD) is securely fastened at an upper distal end to the roof left-right center beam (16LRC), a roof left-front support beam (16LFD) is securely fastened at a lower distal end to the roof back-front-back left lower beam (16BFLL) and the roof left-right-front lower beam (16LRFL), the roof left-front support beam (16LFD) is securely fastened at an upper distal end to the roof left-right center beam (16LRC), a roof right-back support beam (16RBD) is securely fastened at a lower distal end to the roof left-right-back lower beam (16LRBL) and the roof back-front-back right lower beam (16BFRL), the roof right-back support beam (16RBD) is securely fastened at an upper distal end to the roof left-right center beam (16LRC), a roof right-front support beam (16RFD) is securely fastened at a lower distal end to the roof left-right-front lower beam (16LRFL) and the roof back-front-back right lower beam (16BFRL), the roof right-front support beam (16RFD) is securely fastened at an upper distal end to the roof left-right center beam (16LRC);

E) a transparent roof (12) which comprises:

i) a back transparent roof (12B) connected to a front transparent roof (12F) by a back-front transparent roof connector (12BFC), the back transparent roof (12B) is securely fastened to the roof right-back support beam (16RBD) and the roof left-back support beam (16LBD), the front transparent roof (12F) is securely fastened to the roof left-front support beam (16LFD) and the roof right-front support beam (16RFD), ii) a left transparent roof (12L) connected to the back transparent roof (12B) by a back-left transparent roof connector (12BLC), left transparent roof (12L) is connected to the front transparent roof (12F) by a front-left transparent roof connector (12FLC), the left transparent roof (12L) is securely fastened to the roof left-front support beam (16LFD) and the roof left-back support beam (16LBD), and iii) a right transparent roof (12R) connected to the back transparent roof (12B) by a back-right transparent roof connector (12BRC), the right transparent roof (12R) is connected to the front transparent roof (12F) by a front-right transparent roof connector (12FRC), the right transparent roof (12R) is securely fastened to the roof right-front support beam (16RFD) and the roof right-back support beam (16RBD).

2. The model house (10) as described in claim 1, wherein the back transparent roof (12B) comprises a back-left transparent roof appendage (12BLA) and a back-right transparent roof appendage (12BRA) and the front transparent roof (12F) comprises a front-left transparent roof appendage (12FLA) and a front-right transparent roof appendage (12FRA), the back-left transparent roof appendage (12BLA) is securely fastened to the front-left transparent roof appendage (12FLA), the right transparent roof appendage (12BRA) is securely fastened to the front-right transparent roof appendage (12FRA).

3. The model house (10) as described in claim 1, further comprises at least three second floor left-right beams (14LRB) which support at least four second floor back-front beams (14BFB), the at least three second floor left-right beams (14LRB) are securely mounted to the columns (18BL, 18BR, 18FL, 18FR, 18LMC, 18RMC) by fasteners (22), a flooring (24) is securely fastened onto the at least four second floor back-front beams (14BFB).

4. The model house (10) as described in claim 1, wherein the roof right-front support beam (16RFD) and the roof right-back support beam (16RBD) are securely fastened to one another by a roof back-front upper right beam (16BFRU) and the roof left-front support beam (16LFD) and the roof left-back support beam (16LBD) are securely fastened to one another by a roof back-front upper left beam (16BFLU).

5. The model house (10) as described in claim 1 further comprises a roof left-right-right-front support beam (16LRRFD) securely fastened at an upper distal end to the roof right-front support beam (16RFD) and securely fastened at a lower distal end to the roofback-front-back right lower beam (16BFRL), a roof back-front-right-front support beam (16BFRFD) securely fastened at an upper distal end to the roof right-front support beam (16RFD) and securely fastened at a lower distal end to the roof left-right-front lower beam (16LRFL), a roof back-front-left-front support beam (16BFLFD) securely fastened at an upper distal end to the roof left-front support beam (16LFD) and securely fastened at a lower distal end to the roof left-right-front lower beam (16LRFL), a roof left-right-left-front support beam (16LRLFD) securely fastened at an upper distal end to the roof left-front support beam (16LFD) and securely fastened at a lower distal end to the roof back-front-back left lower beam (16BFLL), a roof left-right-left-back support beam (16LRLBD) is securely fastened at an upper distal end to the roof left-back support beam (16LBD) and securely fastened at a lower distal end to the roof back-front-back left lower beam (16BFLL), a roof back-front-left-back support beam (16BFLBD) is securely fastened at an upper distal end to the roof left-back support beam (16LBD) and securely fastened at a lower distal end to the roof left-right-back lower beam (16LRBL), a roof back-front-right-back support beam (16BFRBD) is securely fastened at an upper distal end to the roof right-back support beam (16RBD) and securely fastened at a lower distal end to the roof left-right-back lower beam (16LRBL), a roof left-right-right-back support beam (16LRRBD) is securely fastened at an upper distal end to the roof right-back support beam (16RBD) and securely fastened at a lower distal end to the roof back-front-back right lower beam (16BFRL).

6. The model house (10) as described in claim 5 further comprises a roof left-right-right-middle support beam (16LRRMD) securely fastened at an upper distal end to the roof left-right center beam (16LRC) and securely fastened at a lower distal end to the roof back-front-back right lower beam (16BFRL), a roof left-right-left-middle support beam (16LRLMD) is securely fastened at an upper distal end to the roof left-right center beam (16LRC) and securely fastened at a lower distal end to the roof back-front-back left lower beam (16BFLL), at least one roof back-front-middle-front support beam (16BFMFD) securely fastened at an upper distal end to the roof left-right center beam (16LRC) and securely fastened at a lower distal end to the roof left-right-front lower beam (16LRFL), at least one roof back-front-middle-back support beam (16BFMBD) securely fastened at an upper distal end to the roof left-right center beam (16LRC) and securely fastened at a lower distal end to the roof left-right-back lower beam (16LRBL).

7. The model house (10) as described in claim 1 further comprises at least one back-middle column (18BM) securely fastened to the base (20) having the base column support (20A) by a fastener (22), the at least one back-middle column (18BM) is securely fastened to the roof left-right-back lower beam (16LRBL) and at least one front-middle column (18FM) securely fastened to the base (20) having the base column support (20A) by a fastener (22), the at least one front-middle column (18FM) is securely fastened to the roof left-right-front lower beam (16LRFL).

8. The model house (10) as described in claim 1 further comprises at least one left-middle column (18LM) securely fastened to the base (20) having the base column support (20A) by a fastener (22), the at least one left-middle column (18LM) is securely fastened to the roof back-front-back left lower beam (16BFLL) by a fastener (22) and at least one right-middle column (18RM) securely fastened to the base (20) having the base column support (20A) by a fastener (22), the at least one right-middle column (18RM) is securely fastened to the roof back-front-back right lower beam (16BFRL).

9. The model house (10) as described in claim 1 further comprises a right overhang column (18RO) securely fastened to the base (20) having the base column support (20A) by a fastener (22) and a left overhang column (18LO) securely fastened to the base (20) having the base column support (20A) by a fastener (22), at least one overhang left-right beam (14LRO) is securely fastened to the right overhang column (18RO) and the left overhang column (18LO) by fasteners (22), at least two overhang back-front beams (14BFO) are securely fastened at a front distal end to the at least one overhang left-right beam (14LRO) and securely fastened at a rear distal end to the roof left-right-front lower beam (16LRFL), a transparent overhang roof (26) is securely fastened to the at least two overhang back-front beams (14BFO).

10. The model house (10) as described in claim 9 further comprises at least one middle overhang column (18MO) securely fastened to the base (20) having the base column support (20A) by a fastener (22), the at least one overhang left-right beam (14LRO) is securely fastened to the at least one middle overhang column (18MO).

11. The model house (10) as described in claim 1, wherein the transparent roof (12) is constructed from a material selected from a group consisting of glass, plastic, and plastic composites.

* * * * *